United States Patent [19]

Levy et al.

[11] Patent Number: 4,839,247
[45] Date of Patent: Jun. 13, 1989

[54] STATIC REGENERATIVE FUEL CELL SYSTEM FOR USE IN SPACE

[75] Inventors: Alexander H. Levy, Bloomfield; Leslie L. VanDine, Manchester; John C. Trocciola, Glastonbury, all of Conn.

[73] Assignee: International Fuel Cells Corporation, South Windsor, Conn.

[21] Appl. No.: 120,439

[22] Filed: Nov. 13, 1987

[51] Int. Cl.⁴ .................... H01M 8/18; C25B 9/00
[52] U.S. Cl. .................................. 429/21; 204/269; 204/DIG. 4
[58] Field of Search ............ 429/21; 204/269, DIG. 4

[56] References Cited

U.S. PATENT DOCUMENTS

| | | | |
|---|---|---|---|
| 3,379,634 | 4/1968 | Rutkowski | 204/269 |
| 3,981,745 | 9/1976 | Stedman | 204/DIG. 4 X |
| 4,074,018 | 2/1978 | Haas et al. | 429/21 |
| 4,087,976 | 5/1978 | Morrow et al. | 204/DIG. 4 X |
| 4,276,145 | 6/1981 | Skala | 204/DIG. 4 X |

Primary Examiner—Stephen J. Kalafut
Attorney, Agent, or Firm—William W. Jones; Edward L. Kochey, Jr.

[57] ABSTRACT

The cell stack can be operated as a fuel cell stack or as an electrolysis cell stack. The stack consists of a series of alternate fuel cell subassemblies with intervening electrolysis cell subassemblies, and interspersed cooling plates. The water produced and consumed in the two modes of operation migrates between adjacent cell subassemblies. The component plates are annular with a central hydrogen plenum and integral internal oxygen manifolds. No fluid pumps are needed to operate the stack in either mode.

16 Claims, 3 Drawing Sheets

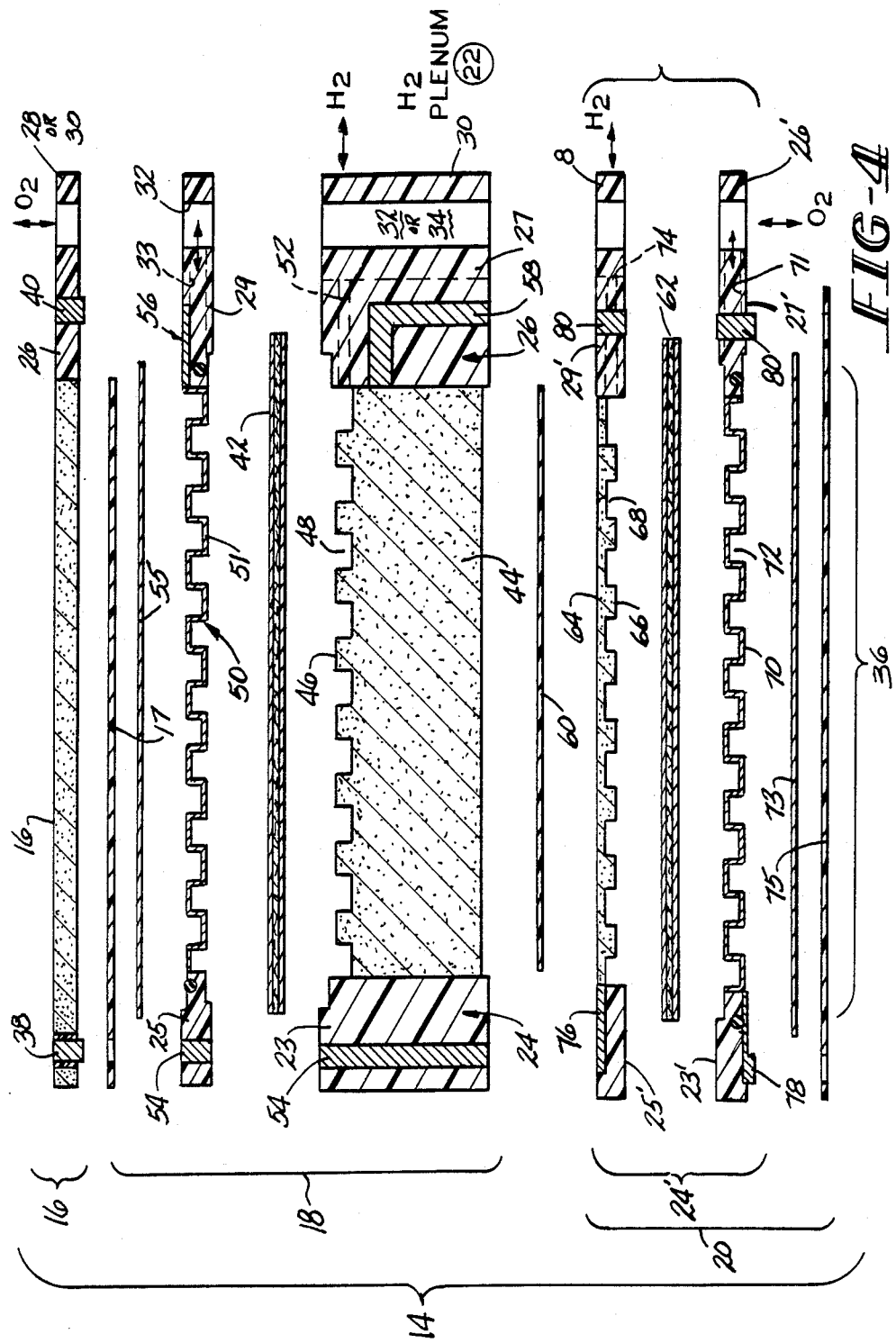

STATIC REGENERATIVE FUEL CELL SYSTEM FOR USE IN SPACE

The invention described herein was made in the performance of work under a NASA contract and is subject to the provisions of Section 305 of the National Aeronautics and Space Act of 1958 (72 stat. 435; 42 U.S.C. 2457).

TECHNICAL FIELD

This invention relates to a regenerative electrochemical cell stack which can operate as an electrolysis cell stack or as a fuel cell stack. More particularly, this invention relates to a stack of the character described which is static or passive in operation and does not require any pumps of the like to move gases, coolant, or product water.

BACKGROUND ART

Electrolytic cell stacks which are regenerative, that is to say which can be operated in an electrolysis mode to produce hydrogen and oxygen, and also in a fuel cell mode to produce electricity and water, can be used in earth orbiting satellites in place of high energy rechargeable batteries. Such a regenerative stack can be operated in its fuel cell mode to produce electricity to power the on-board satellite systems during such times as the satellite has no access to sunlight. During periods when the satellite is exposed to sunlight, solar panels on the satellite will produce electricity to operate the on-board electrical systems, and also to operate the stack in its electrolysis mode. When operating in the electrolysis mode, the stack produces hydrogen and oxygen which are stored for later consumption by the stack when operating in the fuel cell mode. When operating in the electrolysis mode, the stack uses up water which is produced in the previous fuel cell operating mode. In order that the water needed in the electrolysis mode can be provided without any mechanical pumps or the like, the stack will be made up of two types of cells, one of which is an electrolysis cell, and the other of which is a fuel cell. The stack will be formed with the cell types adjacent to each other so that water formed by the fuel cell mode of operation can migrate into the electrolysis cells during the electrolysis mode of operation to be consumed. This type of stack is disclosed in an Air Force Aero Propulsion Laboratory Report, Air Force Systems Command, Wright Patterson Air Force Base dated September, 1973. This report is entitled "Dual Cell Regenerative Fuel Cell Follow-On Investigation" and was authored by J. K. Stedman and D. B. Baillieul. This prior art design, even though operating in a static or passive manner, is structurally complex in that it includes the use of a bellows to equalize oxygen and hydrogen pressures; requires a separate hydrogen tank inside of the stack; and uses semi-cylindrical cell plates which are difficult to manufacture and form into a stack.

DISCLOSURE OF THE INVENTION

The stack assembly of this invention is less complicated; does not include a separate hydrogen tank in the stack; and is constructed from flat cell plates which are formed in conventional presses. The stack of this invention is formed with alternating electrolysis and fuel cell subassemblies stacked one atop the other. Each fuel cell subassembly will then be paired with an electrolysis cell subassembly, and the pairs will all be separated from each other by cooling plates. The cooling plates do not use an active coolant fluid, such as air or water, but are simply solid carbon plates which conduct heat to the outer edge of the stack. The stack is housed in a pressurized containment vessel which is cooled from the outside by the satellite cooling system. Each of the component plates is generally annular in configuration so that the stack is formed with a central axial recess which serves as an integral hydrogen plenum for the stack. The oxygen is fed to and from the cells by oxygen manifolds which are formed from integral manifold components on each cell and coolant plate. The stack of this invention does not require the use of a bellows or a separate internal tank to hold the hydrogen. The oxygen and hydrogen will be housed in separate tanks externally of the stack.

It is therefore an object of this invention to provide a regenerative electrolytic cell stack which can be operated either as a fuel cell stack or as an electrolysis cell stack.

It is a further object of this invention to provide a cell stack of the character described which operates passively without fluid pumps in either mode.

It is another object of this invention to provide a cell stack of the character described which uses different cells in the stack to operate in each mode.

It is an additional object of this invention to provide a cell stack of the character described where a passive fluidless cooling system is used.

These and other objects and advantages of the invention will become more readily apparent from the following detailed description of a preferred embodiment thereof when taken in conjunction with the accompanying drawings in which.

BRIEF DESCRIPTION OF DRAWINGS

FIG. 4 is a fragmented exploded sectional view of one of the repeating subassemblies of the stack taken along line 4—4 of FIG. 3.

BEST MODE FOR CARRYING OUT THE INVENTION

Figure 1:
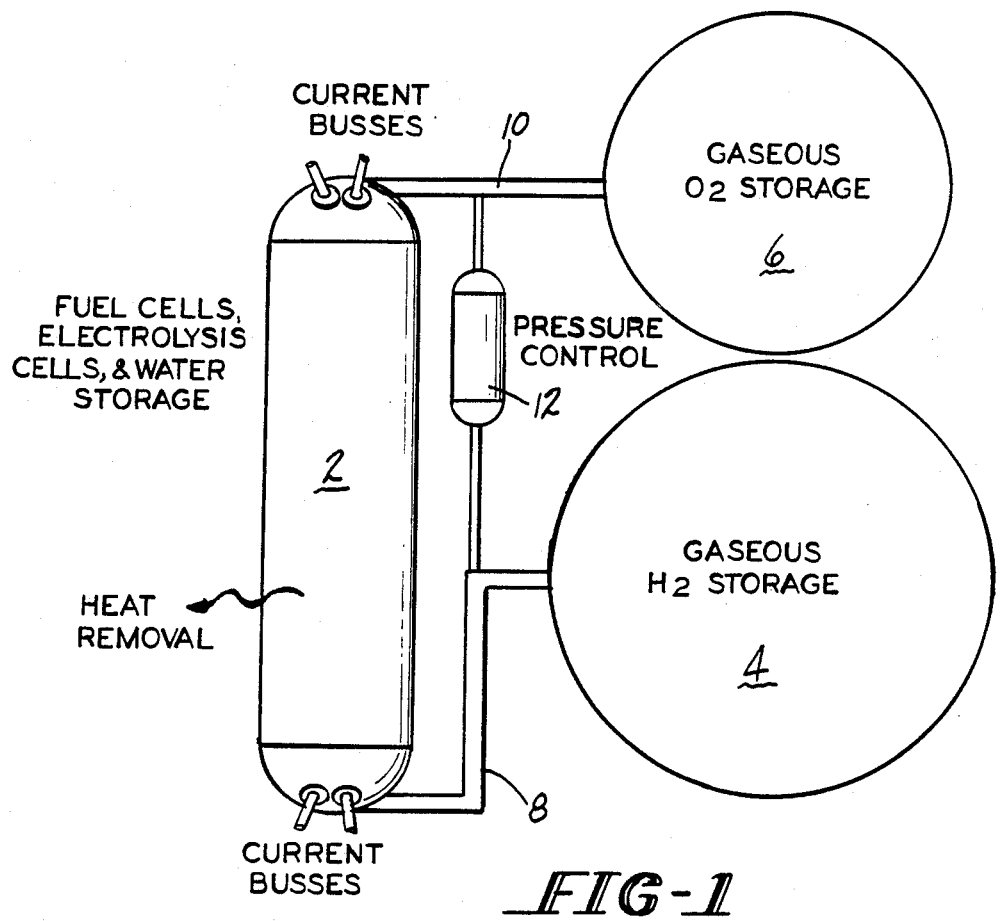
FIG. 1 is a schematic view of a preferred embodiment of a regenerative system formed in accordance with this invention.

Referring now to the drawings, there is shown in FIG. 1, a schematic representation of a regenerative electrolytic system formed in accordance with this invention. The system includes a cell stack assembly housed in a pressure vessel; a hydrogen storage tank 4 external of the vessel 2; and an oxygen storage tank 6 external of the vessel 2. A first conduit 8 ducts hydrogen to and from the vessel 2, and a second conduit 10 ducts oxygen to and from the vessel 2. It will be understood that when the system is operating in its fuel cell mode, hydrogen and oxygen will move through the conduits 8 and 10 from the tanks 4 and 6 to vessel 2. When the system operates in its electrolysis cell mode, hydrogen and oxygen will move through the conduits 8 and 10 from the vessel 2 to the tanks 4 and 6 respectively. The reactant pressures will vary from about 60 psia (which occurs at the end of a fuel cell mode cycle)

to about 300 psia (which occurs at start-up and at the end of an electrolysis cell mode cycle). The pressure on the oxygen side of the mechanism will be kept slightly higher than the hydrogen side pressure by a pressure control 12. During normal discharge operation of the fuel cell mode, reactant pressure decreases from 300 psia to about 60 psia, and the electrolyte concentration in the fuel cells decreases from about 45 to about 32% KOH.

The system will be launched in the charged mode, with hydrogen and oxygen stored in tanks 4 and 6 at fuel pressures of about 300 psia. Startup of the fuel cell mode can be accomplished in a matter of minutes by feeding hydrogen and oxygen to the fuel cells. Waste heat generated in the stack, plus heat supplied by electrical heaters, if desired, which heaters are operated by fuel cell output, are used to raise the cell stack to operating temperatures. During start-up, heat rejection from the vessel wall should be inhibited to shorten start-up time. After startup the inner wall temperature of the pressure vessel 2 and the reactant tanks 4 and 6 are maintained at above 156° F. to prevent water condensation.

Figure 2:
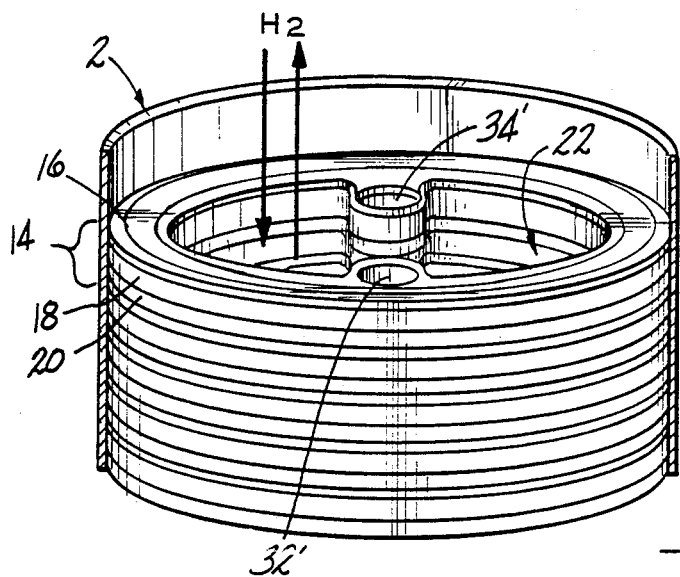
FIG. 2 is a fragmented perspective view, partially in section of the stack portion of the system of this invention.

Referring now to FIG. 2, it will be noted that the stack constituents disposed in the pressure vessel 2 are generally annular in configuration, and are disposed one atop another in cyclic alternating fashion. Each repeating component 14 includes three subassemblies which are: a cooling plate 16; a fuel cell subassembly 18; and an electrolysis cell subassembly 20. In the center of the stack is a plenum 22 which is filled with hydrogen. The plenum 22 communicates with the hydrogen conduit 8 and with the hydrogen side of each of the cells, both fuel cells and electrolysis cells, in the stack.

Figure 3:
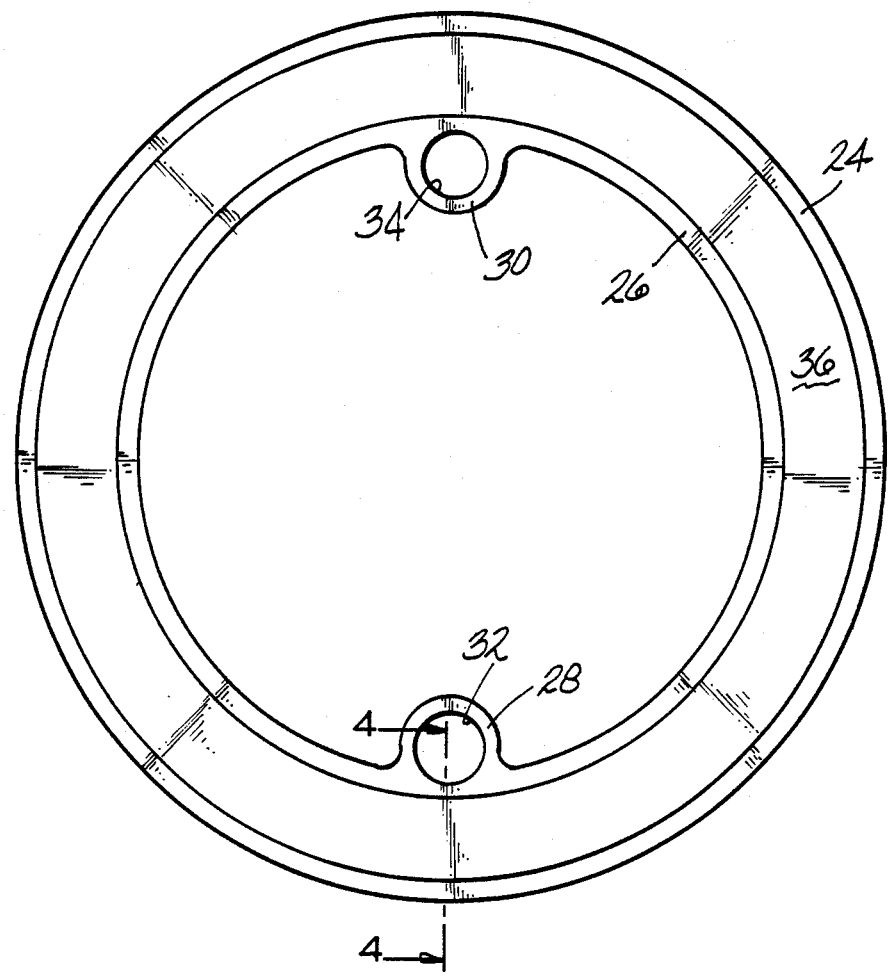
FIG. 3 is a plan view of the plate structure used to form the stack.

As will be seen best in FIG. 3, each plate subassembly 18 and 20, includes an outer frame portion 24 and an inner frame portion 26 which are formed from polyphenylene sulphide epoxy, or other suitable materials. The cooling plate 16 has only the inner frame 26. The inner frame 26 has a pair of inwardly directed bosses 28 and 30 through which passages 32 and 34 extend. In the assembled stack the passages 32 and 34 are all aligned to form two oxygen manifolds 32 and 34 for delivering oxygen to the oxygen side of all of the fuel cells in the stack, and for ducting oxygen away from all of the electrolysis cells in the stack. Both of the manifolds 32 and 34 are separated from the hydrogen side of all of the cells in the stack. Between the frames 24 and 26 are the operable parts of the cells, designated generally by the numeral 36 in FIG. 3.

FIG. 4 shows each of the subassemblies of the repeating components 14. As noted, the cooling plates 16 do not have an outer frame member, but rather have only the inner frame member 26. The cooling plates 16 are formed from pressed carbon. At the outer margin of the cooling plates 16 are conductor pins 38 which conduct electricity to the electrolysis cells in the stack. The electrolysis cells are wired to their current source bus through the outside margin of the stack, and the fuel cells are wired to their load bus through the inside margin of the stack as will be explained in greater detail hereinafter. There is a fuel cell conductor pin 40 which extends through the inner frame 26 of the cooling plates 16.

The fuel cell subassembly 18 includes the outer frame 24, which actually consists of two parts 23 and 25 which are butted and joined together The inner frame 26 also consists of two parts 27 and 29 butted and joined together The cell structure includes a matrix layer 42 which holds the electrolyte and which is sandwiched between conventional alkaline electrode substrates with typical catalyst components coated thereon to form a cathode and an anode. An electrolyte reservoir plate 44 is disposed adjacent to the electrode assembly, and includes a plurality of projections 46 with intervening recesses 48 facing the electrode assembly. The projections 46 form a structure similar to a waffle iron. The plate 44 is formed from graphite and is porous so as to form a source of electrolyte which wicks into the matrix layer 42 via the projections 46. The recesses 48 form a flow field for the hydrogen reactant gas. Water which is formed by the electrochemical reaction in the fuel cells 18 is absorbed into the plate 44 during operation of the fuel cells 18. On the side of the matrix 42 opposite the reservoir plate 44 is a formed nickel plate 50 having like projections 51 which form reactant flow passages for the oxygen. Passages 52 extend from the plenum 22 through the inner frame part 27 to the recesses 48 to allow hydrogen to flow from the plenum 22 to the anode side of the fuel cell 1. The flow passages formed by the formed nickel plate 50 are connected to the oxygen manifold 32 or 34 by passages 33 through the frame component 29. A conductor pin 54 for the electrolysis cells 20 extends through the outer frame 24. An electrical contact 56 is mounted on the top side of the inner frame 26, and a conductor pin 58 extends from the reservoir plate 44 through the inner frame member 27 toward the electrolysis cell 20. The contact 56 and conductor pin 58 conduct electricity produced by operation of the fuel cells 18. A Monel cover plate 55 backs the nickel plate 50 overlying the contact 56 to serve as a current collector for the contact 56. A PTFE insulating sheet 17 is interposed between the Monel plate 55 and the cooling plate 16.

Between the fuel cells 18 and electrolysis cells 20 are gas porous membranes 60 formed from porous PTFE and operable to 450° F. Each of the electrolysis cells 20 includes an electrolyte matrix 62 containing the electrolyte and having electrode substrates containing appropriate catalysts disposed on opposite sides of the matrix 62. The electrode portion of the electrolysis cells 20 is sandwiched between parts 23' and 25' of the outer frame member 24', and between parts 27' and 29' of the inner frame member 26'. A porous graphite reservoir plate 64 having protrusions 66 and recesses 68 facing the electrode portion of the cell 20 is disposed adjacent to the membrane 60. The flat sides of the reservoir plates 44 and 64 are facing each other with only the membrane 60 interposed therebetween. Water that is formed in the fuel cells during operation of the fuel cell mode of the stack collects in the reservoir plate 44 and migrates through the plate 44 and membrane 60 into the reservoir plate 64 when the stack operates in its electrolysis mode. Thus the water necessary for the electrolysis reaction is formed by the fuel cell reaction, and migrates from one cell to the next by means of vapor and liquid diffusion, without requiring any mechanical pumps. A formed nickel plate 70 is disposed on the side of the matrix 62 opposite the reservoir plate 64 and forms passages 72 for the flow of oxygen formed at the matrix 62 during the electrolysis reaction. Passages 74 are formed in the inner frame 26' for venting hydrogen from the recesses 68 to the plenum 22. Oxygen is vented from the recesses 72 into the manifolds 32 and 34 through passages 71 which occupy locations circumferentially offset from the hydrogen passages 74 and 52.

On the outer frame 24' are electrolysis current contacts 76 and 78. Conductor pins 80 for the fuel cell current load are disposed in the inner frame 26'. A Monel cover plate 73 overlies the plate 70 and contacts 78 to conduct current to the plate 70 from the contacts 78, and a PTFE insulating sheet 75 is disposed adjacent to the cover plate 73.

The integrated stack design will be composed of interleaved separate fuel and electrolysis cells. The interleaved cells are the same size and are placed back to back to minimize the distance required for the transfer of water between modes of operation. The total number of cells is chosen to meet the bus voltage requirement of 120 volts during fuel cell operation and the size of the cells is set by the performance and power requirements of fuel cell operation. The volts per cell required for electrolysis is a function of the required overall system efficiency, the system parasitic losses, and the chosen fuel cell stack volts per cell. A typical example of a 55% efficient system has a fuel cell volts-per-cell of 0.843 and the required electrolysis cell voltage of 1.5 resulting in a total stack voltage of a 120 volts in the fuel cell mode and 213 volts in the electrolysis mode. In order to more closely match the required 120 volt bus, the stack may be split into two substacks and during fuel cell operation the substacks can be connected in series outputting 120 volts. The substacks would then be connected in parallel during the electrolysis mode of operation requiring an input voltage of 107 volts. Matching of the bus voltages and the required electrolysis stack voltages can be achieved in a number of ways: (a) by a relatively small adjustment in the bus voltages by a power conditioner added to the system; (b) by fine tuning the fuel cell stack voltages; or (c) by the use of more than two substacks in a more complex series-parallel arrangement.

The passive transfer of water from the fuel cell to the electrolyzer is relatively simple in the integrated system of this invention. The water is formed in the fuel cell mode and stored in the porous carbon electrolyte reservoir plate (ERP) adjacent to the fuel cell anode passage. The integrated system with its interleaved cells has these water storage ERP's between alternate fuel cells and electrolysis cells and therefore water transfer is accomplished by the diffusion of water through the relatively short path length of the thickness of the ERP. Calculations have shown the diffusion of water through the liquid and vapor regions of the ERP can satisfy the water requirements for the electrolysis phase of operation in both a geosynchronous earth orbit (GEO) and Mid-earth orbit (MEO) application. The water transfer rates required in the GEO application for an integrated system is proportional to the electrolysis cell current density. The current density is relatively low due to the large electrolysis cells that result from the equal fuel cell and electrolysis cell areas imposed by the configuration, and is also low due to the short discharge period (1.2 hrs) relative to the charge period (22.8 hrs) characteristic of GEO. MEO consists of equal length charge and discharge periods of three hours. This does increase the required operating electrolysis mode current densities and the corresponding water transfer flow rates, however estimates show that the integrated system configuration of this invention can meet the MEO requirements.

Since many changes and variations of the disclosed embodiment of the invention may be made without departing from the invention concept, it is not intended to limit the invention otherwise than as required by the appended claims.

We claim:

1. A repeating component within an electrochemical cell stack comprising:
   (a) means forming a flat fuel cell electrolyte matrix;
   (b) a flat porous fuel cell electrolyte reservoir plate abutting said fuel cell electrolyte matrix and operable to draw and store product water from said fuel cell electrolyte matrix when the stack is operating in a fuel cell mode;
   (c) a flat porous electrolysis cell electrolyte reservoir plate adjacent to said fuel cell electrolyte reservoir plate;
   (d) means forming a flat electrolysis cell electrolyte matrix abutting said electrolysis cell electrolyte reservoir plate, the latter being operable to draw water from said fuel cell electrolyte reservoir plate to said electrolysis cell electrolyte matrix for consumption when the stack is operating in an electrolysis cell mode;
   (e) a first formed metallic separator plate adjacent to said fuel cell electrolyte matrix;
   (f) a first flat current conductor plate adjacent to and in contact with said first formed plate;
   (g) a first insulating sheet adjacent said first conductor plate;
   (h) a second formed metallic separator plate adjacent to said electrolysis cell electrolyte matrix;
   (i) a second flat current conductor plate adjacent to and in contact with said second formed plate;
   (j) a second insulating sheet adjacent said second conductor plate; and
   (k) a flat cooling plate adjacent at least one of said insulating sheets.

2. The cell stack of claim 1 comprising a porous PTFE sheet interposed between said reservoir plates.

3. An electrochemical assembly comprising:
   (a) a plurality of flat fuel cell subassemblies interleaved with an equal number of electrolysis cell subassemblies, all of said subassemblies being stacked one atop another to form a generally cylindrical stack; and
   (b) each of said subassemblies including a porous electrolyte reservoir plate component; with the fuel cell reservoir plate components being disposed adjacent to the electrolysis cell reservoir plate components whereby product water from the fuel cell subassemblies will diffuse through the adjacent reservoir plates to be consumed by the electrolysis cell subassemblies.

4. The assembly of claim 3 wherein all of the cell subassemblies are formed from flat annular components, which annular components combine to form a central axially extending reactant plenum in the cylindrical 5. The assembly of claim 4 wherein all of said flat annular components include inner dielectric frame portions which combine to form a wall of said reactant plenum.

6. The assembly of claim 5 wherein each of said inner frame portions is formed with means forming an opening which extends parallel to the axis of said cylindrical stack, with said openings in said inner frame portions combining to form at least one reactant manifold in said stack.

7. The assembly of claim 6 further comprising first passages formed in said inner frame portions interconnecting said reactant plenum with electrochemically active portions of said fuel cell subassemblies and said electrolysis cell subassemblies, and second passages formed in said inner frame portions interconnecting said reactant manifold with said electrochemically active portions of said fuel cell subassemblies and said electrolysis cell subassemblies.

8. The assembly of claim 7 further comprising hydrogen and oxygen reactant tanks external of said stack, one of said reactant tanks being connected to said reactant plenum and the other of said reactant tanks being connected to said reactant manifold.

9. The assembly of claim 8 wherein all of said cell subassemblies include outer dielectrical frame portions radially outwardly offset from said inner dielectric frame portions with the electrochemically active portions of said cell subassemblies being interposed between said inner and outer frame portions.

10. The assembly of claim 9 further comprising first current conducting means in each one of said inner or outer frame portions, said first current conducting means being operably connected to the electrochemically active portions of each of said fuel cell subassemblies and bypassing the electrochemically active portions of each of said electrolysis cell subassemblies; and second current conducting means in each of the other of said inner or outer frame portions, said second current conducting means being operably connected to the electrochemically active portions of each of said electrolysis cell subassemblies and bypassing the electrochemically active portions of each of said fuel cell subassemblies.

11. The assembly of claim 10 further comprising a flat annular carbon cooling plate disposed adjacent to each matched pair of fuel cell and electrolysis cell subassemblies in the stack, said cooling plates being operable to conduct heat from said fuel cell subassemblies radially outwardly to an outer surface of said stack.

12. For use in constructing an electrochemical stack assembly, a fuel cell/electrolysis cell component comprising:
(a) a flat annular fuel cell subassembly having:
    (i) a flat inner annular dielectric frame portion having an inner wall which forms a central plenum;
    (ii) a flat outer annular dielectric frame portion concentric with and spaced apart from said inner frame portion; and
    (iii) an electrochemically active portion sandwiched between and contained by said frame portions, said active portion including a fuel cell electrolyte matrix bounded on one side by an oxygen flow field, and bounded on an opposite side by a hydrogen flow field, said active portion further including a porous fuel cell electrolyte reservoir plate adjacent to said hydrogen flow field and contacting said fuel cell electrolyte matrix, said fuel cell electrolyte reservoir plate being operable to draw product water away from the fuel cell matrix during operation of said fuel cell subassembly; and (b) a flat annular electrolysis cell subassembly disposed adjacent to said fuel cell subassembly, said electrolysis cell subassembly having:
    (i) a flat inner annular dielectric frame part having an inner wall which conforms to said central plenum;
    (ii) a flat outer annular dielectric frame part concentric with and space apart from said inner frame part, said inner and outer frame parts abutting said inner and outer frame portions of said fuel cell subassembly; and
    (iii) an electrochemically active part sandwiched between and contained by said frame parts, said active part including an electrolysis cell electrolyte matrix bounded on one side by an oxygen flow field, and bounded on an opposite side by a hydrogen flow field, said active part further including a porous electrolysis cell electrolyte reservoir plate adjacent to said hydrogen flow field and contacting said electrolysis cell matrix, said electrolysis cell electrolyte reservoir plate also being disposed opposite said fuel cell electrolyte reservoir plate and so positioned that water from said fuel cell electrolyte reservoir plate can flow therefrom into said electrolysis cell electrolyte reservoir plate to said electrolysis cell matrix to be consumed during operation of the electrolysis cell subassembly.

13. The fuel cell/electrolysis cell component of claim 12 wherein said inner frame portion and inner frame part include cooperating means forming a reactant passage manifold for carrying a reactant to said fuel cell and electrolysis cell subassemblies.

14. The fuel cell/electrolysis cell component of claim 13 comprising means in said inner frame portion and inner frame part operable to form reactant passages extending between said manifold and said electrochemically active portion and part of said fuel cell and said electrolysis cell subassemblies respectively whereby the reactant can flow to said manifold from said electrolysis cell active part, and from said manifold to said fuel cell active portion.

15. The fuel cell/electrolysis cell component of claim 14 wherein said outer frame portion and said outer frame part are each provided with first conducting means operable together to conduct electricity to or from the active part or portion of one of said electrolysis cell and said fuel cell subassemblies while electrically bypassing the active part or portion of the other of said electrolysis cell and fuel cell subassemblies.

16. The fuel cell/electrolysis cell component of claim 15 wherein said inner frame portion and said inner frame part are each provided with second conducting means operable together to conduct electricity to or from the active part or portion of the component which is bypassed by said first conducting means, and said second conducting means being operable to bypass the active part or portion of the component which is electrically connected to said first conducting means.

* * * * *